US011945246B2

(12) United States Patent
Garza

(10) Patent No.: US 11,945,246 B2
(45) Date of Patent: *Apr. 2, 2024

(54) CRAFTWORK TOOLS AND KITS

(71) Applicant: My Sweet Petunia, Inc., Humble, TX (US)

(72) Inventor: Iliana Garza, Humble, TX (US)

(73) Assignee: My Sweet Petunia, Inc., Humble, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,723

(22) Filed: Jan. 24, 2023

(65) Prior Publication Data

US 2023/0271439 A1 Aug. 31, 2023

Related U.S. Application Data

(63) Continuation of application No. 17/095,084, filed on Nov. 11, 2020, now abandoned, which is a (Continued)

(51) Int. Cl.

| | |
|---|---|
| ***B41K 3/02*** | (2006.01) |
| ***B41K 1/00*** | (2006.01) |
| ***B41K 3/04*** | (2006.01) |
| ***B41K 3/44*** | (2006.01) |
| ***B41K 3/46*** | (2006.01) |
| ***B44B 5/00*** | (2006.01) |
| ***B44B 5/02*** | (2006.01) |

(52) U.S. Cl.

CPC .................. *B41K 3/02* (2013.01); *B41K 1/00* (2013.01); *B41K 3/44* (2013.01); *B41K 3/46* (2013.01); *B44B 5/0052* (2013.01); *B44B 5/0085* (2013.01); *B41K 3/04* (2013.01); *B44B 5/00* (2013.01); *B44B 5/02* (2013.01)

(58) Field of Classification Search

CPC .......... B41K 3/02; B41K 1/00; B44B 5/0052; B44B 5/0085; B44B 5/00; B44B 5/02

See application file for complete search history.

(56) References Cited

U.S. PATENT DOCUMENTS

2011/0139021 A1* 6/2011 Angevine ............. B44B 5/0071 101/26
2012/0192733 A1* 8/2012 Angevine ............... B44B 5/026 101/26

* cited by examiner

*Primary Examiner* — Peter J Macchiarolo
*Assistant Examiner* — John M Royston
(74) *Attorney, Agent, or Firm* — Shane Cortesi

(57) ABSTRACT

A craftwork accessory may provide a portable and/or easy-to-use tool to help users accurately and repeatedly apply stamp impressions and the like to items such as cardstock. The accessory may include a base portion, one or more elevated side portions and cover portion. The side portions may define a workspace for arranging the item. The cover portion may be movably attached to the base portion or a side portion, for example, by one or more hinges. In operation, the item and stamp may be aligned in the workspace and the cover portion may be pressed onto the stamp to stick the stamp to the cover portion. The cover may then be opened, the stamp may be inked, and the cover portion may be closed and pressed onto the item to stamp the item. The accessory may include alignment indicia on the base portion, side portions and/or cover portion to facilitate placement of the item and/or stamp. The accessory may also include fastening mechanisms, such as magnetic elements, to facilitate placement of the item and/or stamp.

35 Claims, 12 Drawing Sheets

Related U.S. Application Data continuation of application No. 16/518,203, filed on Jul. 22, 2019, now Pat. No. 10,836,193, which is a continuation of application No. 16/150,444, filed on Oct. 3, 2018, now abandoned, which is a continuation of application No. 15/881,761, filed on Jan. 27, 2018, now abandoned, which is a continuation of application No. 15/654,939, filed on Jul. 20, 2017, now Pat. No. 9,931,875, which is a continuation of application No. 15/584,761, filed on May 2, 2017, now Pat. No. 9,849,705, which is a continuation of application No. 15/424,600, filed on Feb. 3, 2017, now Pat. No. 9,731,531, which is a continuation of application No. 14/595,480, filed on Jan. 13, 2015, now Pat. No. 9,597,909.

CRAFTWORK TOOLS AND KITS

RELATED APPLICATIONS

This application is a continuation of U.S. patent application Ser. No. 17/095,084, filed Nov. 11, 2020 and entitled "CRAFTWORK TOOLS AND KITS", which is a continuation of U.S. patent application Ser. No. 16/518,203, filed Jul. 22, 2019 and entitled "CRAFTWORK TOOLS AND KITS", which is a continuation of U.S. patent application Ser. No. 16/150,444, filed Oct. 3, 2018 and entitled "CRAFTWORK TOOLS AND KITS", which is a continuation of U.S. patent application Ser. No. 15/881,761, filed Jan. 27, 2018 and entitled "CRAFTWORK TOOLS AND KITS", which is a continuation of U.S. patent application Ser. No. 15/654,939 (now U.S. Pat. No. 9,931,875), filed Jul. 20, 2017, and entitled "CRAFTWORK TOOLS AND KITS", which is a continuation of U.S. patent application Ser. No. 15/584,761 (now U.S. Pat. No. 9,849,705), filed May 2, 2017 and entitled "CRAFTWORK TOOLS AND KITS", which is a continuation of U.S. patent application Ser. No. 15/424,600 (now U.S. Pat. No. 9,731,531), filed Feb. 3, 2017 and entitled "CRAFTWORK TOOLS AND KITS", which is a continuation of U.S. patent application Ser. No. 14/595,480 (now U.S. Pat. No. 9,597,909), filed Jan. 13, 2015 and entitled "CRAFTWORK TOOLS AND KITS", the entire contents of each of the aforementioned patents and applications are incorporated herein by reference in their entirety.

BACKGROUND

Technical Field

The present application relates to tools for generating craft items, such as cards, and kits for generating craft items.

Background of the Invention

It is increasingly popular to make craft or handmade items such as cards, announcements and the like. Not only are the custom cards fun to make for crafters, the cards are appreciated more by the recipient. To help those that want to make a single birthday card or hundreds of wedding invitations, a wide variety of card blanks, toppers and embellishments are available. Stamps and stamp kits provide a great way for the average crafter to add professional quality graphics to their items. However, it can be difficult to properly align the stamp and/or get a clean impression on the item. If a clean impression is not made on the first attempt, the stamp must be realigned in exactly the same position or the item will be unusable.

To address these problems, a variety of tools have been developed to help apply stamps to items. However, these tools present their own problems. For example, printing press apparatuses may allow for repeated stamping in the same position, but they are costly and bulky. Often, these devices also make it difficult to see how the stamp will look on the item before making an impression. Smaller, portable items, such as that described in U.S. Pat. No. 6,453,573, generally allow a user to see how the stamp will look on the item before leaving an impression, but it is difficult to realign the stamp in the same position if a more than one impression is required.

Accordingly, a need has long existed for an improved craftwork accessory item.

BRIEF SUMMARY

In one embodiment, a craftwork accessory may provide a portable and/or easy-to use tool to help users' accurately and repeatedly apply stamp impressions and the like to items such as cardstock. The accessory may include a base portion, one or more elevated side portions and cover portion. The side portions may define a workspace for arranging the item. The cover portion may be movably attached to the base portion or a side portion, for example, by one or more hinges. In operation, the item and stamp may be aligned in the workspace and the cover portion may be pressed onto the stamp to stick the stamp to the cover portion. The cover may then be opened, the stamp may be inked, and the cover portion may be closed and pressed onto the item to stamp the item. The accessory may include alignment indicia on the base portion, side portions and/or cover portion to facilitate placement of the item and/or stamp. The accessory may also include fastening mechanisms, such as magnetic elements, to facilitate placement of the item and/or stamp.

Other systems, methods, features and advantages of the invention will be, or will become apparent to one with skill in the art upon examination of the following figures and detailed description. It is intended that all such additional systems, methods, features and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting.

Figure 1:
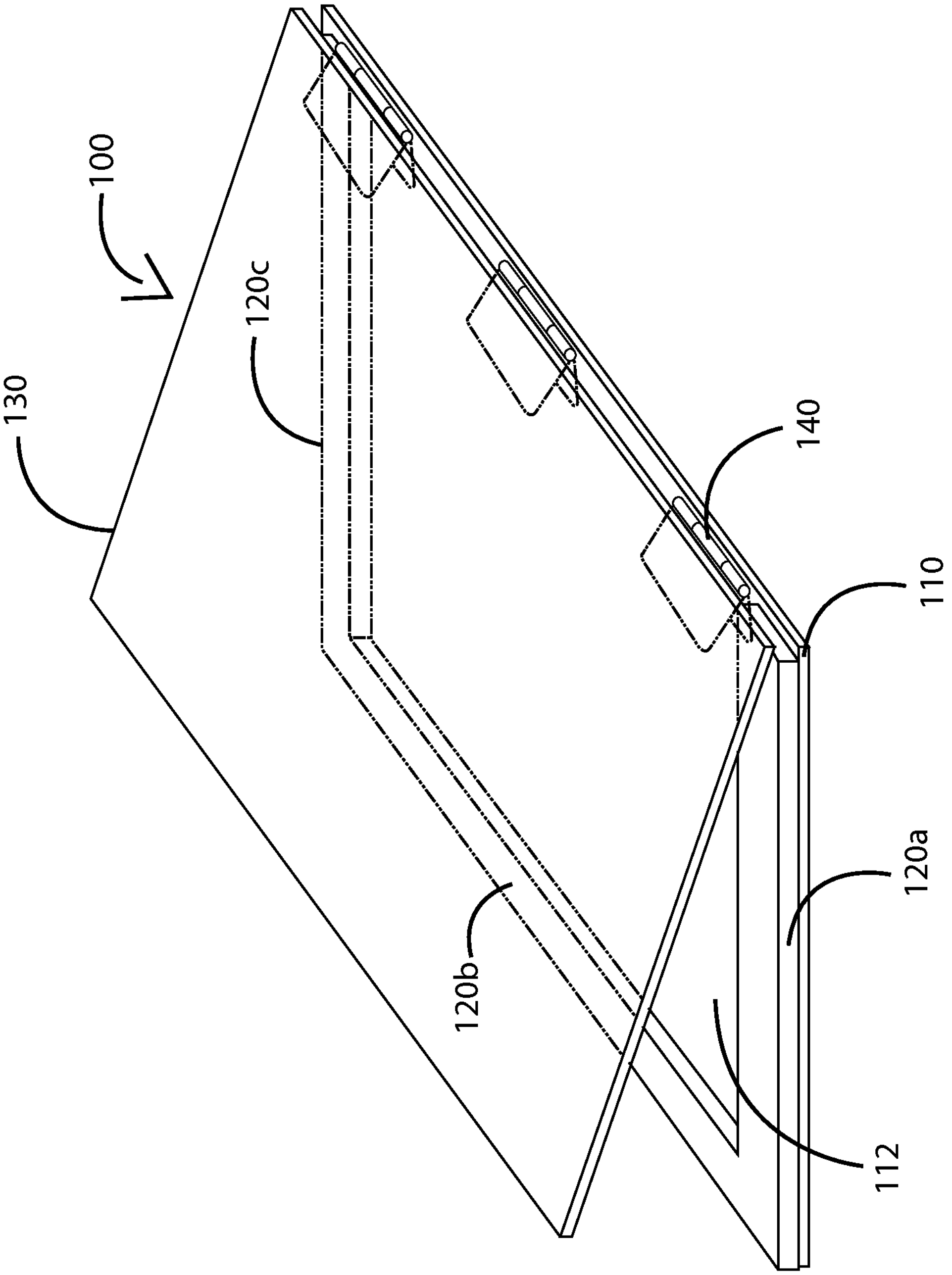
FIG. 1 shows a perspective view of an exemplary craftwork tool.

Referring to FIG. 1, an exemplary craftwork accessory 100 is shown. The accessory 100 may include a base portion 110, one or more elevated side portions 120*a*, 120*b*, and 120*c*, and cover portion 130. The side portions 120*a-c* may define a workspace 112 on the base portion 110 that may be used to place the item to be stamped or otherwise adorned. In some embodiments, such as the embodiment shown in FIG. 1, the accessory 100 may include three elevated side portions 120*a-c*. In other embodiments, more or less elevated side portions may be provided. The cover portion 130 may be moveably attached to the base portion 110. Alternatively, or additionally, the cover portion 130 may be attached to one or more side portions 120*a-c* and/or the base portion 110. In the illustrated embodiment, the cover portion 130 is attached to the base portion 110 by a hinge assembly 140, Other mechanisms for moveably attaching the cover portion 130 to other components of the accessory 100 may also be used. These may include, for example, brass hinges, piano hinges, non-hinge assemblies, and the like.

In one embodiment, the overall footprint of the accessory 100 is about 8" by about 10". In other embodiments, the width of the footprint of the accessory 100 may be between about 5" and about 15" and the length of the footprint of the accessory 100 may be between about 6" and about 16". These sizes typically allow the accessory 100 to be compatible with most common cardstock and the like while maintaining portability of the accessory 100. Other sizes may also be used. Alternatively, or additionally, the accessory 100 may be sold in various sizes, such as extra small, small, medium, large, and extra-large and/or in various colors. In some embodiments, different colors may be used for different components of the accessory.

The components of assembly 100 may be made of any suitable material. For example, rigid or semi-rigid materials such as acrylic, metal, tempered glass, cardboard and the like may be used. The components may be made of the same material, or different components may be made using different materials or combinations of materials. The assembly 100 as a whole may be made of a unified construction, subsets of components made of a unified construction, or each component may be separately constructed.

Figure 2:
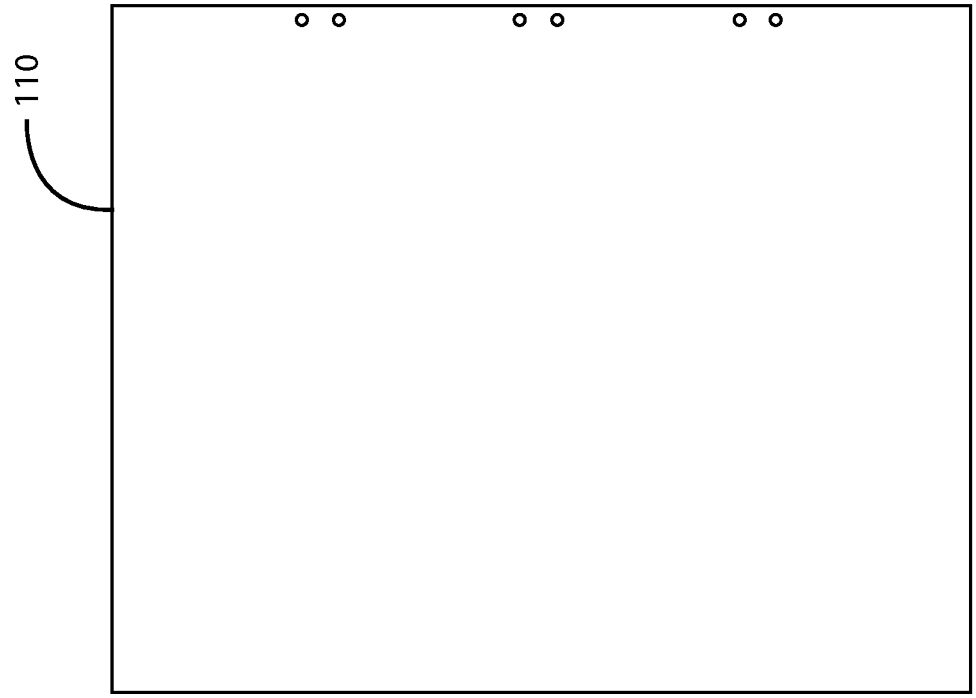
FIG. 2 shows a base portion of an exemplary craftwork tool.

An exemplary base portion 110 of an exemplary craftwork accessory 100 is shown in FIG. 2. The base portion 110 may be made of any suitable rigid or semi-rigid material, such as acrylic or the like. The base portion 110 may be translucent or opaque, clear or colored. The base portion 110 may define some or ail of the footprint of the accessory item 100. For example, the base portion 110 may have a width of about 8", a length of about 10", and a thickness of about 3/32". Other sizes may also be used. The base portion 110 may include indicia 114 (FIG. 8*a*) to facilitate of an item on the workspace 112 of the base portion 110. The indicia 114 may include, for example, grid lines, ruler markings, and the like. The indicia 114 may be printed or laser etched onto either an upper or lower surface of the base portion 110 itself. Alternatively, or additionally, additional components including indicia 114 may be placed under or atop the base portions 110, such as a piece of grid paper, to facilitate alignment of the item on the workspace. Optionally, the bottom of the base portion 110 may be made of a material having a suitable coefficient of friction to impede movement or slippage of the accessory 100 during normal use (also referred to herein as a "non-slip" surface). Alternatively or additionally, such a material may be attached to or applied to the bottom or the top of the base portion 110.

Optionally, the accessory may include a fastening mechanism for securing the item to the work space. In one embodiment, the base portion 110 may include metal or other ferromagnetic material 118 (FIG. 5) for cooperating with a magnet 119 (FIG. 8*b*) placed on top of the item to secure the item on the workspace 112. Alternatively, or additionally, the ferromagnetic material 118 may be disposed above or below some or all of the workspace 112. Other mechanism may also be used to fasten the item to the workspace 112. For example, a top surface of the workspace 112 may have a coefficient of friction that impedes movement of an item placed thereon.

Figure 3B:
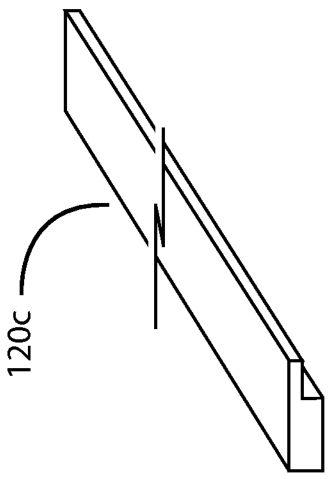
FIGS. 3*a-b* show side portions of an exemplary craftwork tool.
Figure 3A:
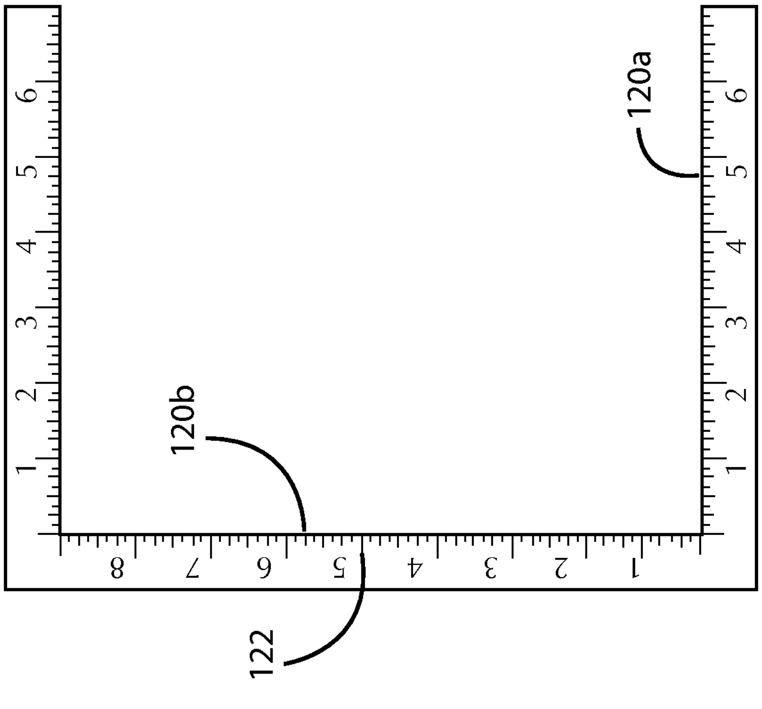

FIGS. 3*a-h* show exemplary side portions 120*a-c* of an exemplary craftwork tool. In FIG. 3*a*, a top view of an exemplary side portions 120*a-c* are shown. The side portions 120*a-c* may be made up of a single piece or multiple pieces. The side portions 120*a-c* may be disposed to the top of the base portion 110. Alternatively, or additionally, one or more of the side pieces may be attached to another part of the base portion 110, such as a side of the base portion 110. In one embodiment, the side portions may be attached to the top of the base portion 110 and have a thickness of at least about one-eighth inch so as to define a workspace 112 that is about one-eight inch deep. Other thicknesses may be used, such as one-quarter inch, one-third inch, one-half inch and the like. In some embodiments, one or more spacers 113 (FIG. 3) may be provided with the accessory to reduce the depth of the workspace 112 relative to the elevated side portions 120*a-c*. Spacer 113 may be, for example, a foam pad. The spacer 113 may have a thickness proportional to the depth of the workspace 112, such as a thickness corresponding to one-half or one-quarter the depth of the workspace 112. Any other ratio may also be used.

Each side portion 120*a-c* may be the same thickness and/or width, or each side portion 120*a-c* may vary in thickness and/or width. For example, each side portion 120*a-c* may be about three-quarters inches wide. The width of the side portions 120*a-c* may vary with the overall footprint of the accessory 100. In some embodiments, the width of a side portion 120*a-c* may be between about five percent and about twelve percent; of the length or width of the overall footprint; of the accessory 100.

The side portions 120*a-c* may span some or all of the length of a side of the accessory 100, and each side piece 120*a-c* may span a different length of its corresponding side. In some embodiments, the side portions 120*a-c* may span at least one-fifth of the length of the side of the accessory 100. In other embodiments, the side portions 120*a-c* may span at least one fourth, one-third, or one-half of the length of a corresponding side of the accessory 100. Other lengths may also be used. The inner part of the side portions 120*a-c* may abut the upper surface of base portion 110, or one or more of the side portions 120*a-c* may include a recessed portion 124 that provides a gap between the upper surface of the base portion and a surface of side portion 120*a-c*. An example of this is shown in FIG. 3*h*. The recessed portion 124 may allow a user of the accessory 100 additional alignment options, such as when creating a border on the item.

Optionally, the side portions 120*a-c* are dimension to allow for the inclusion of indicia 122 for facilitating alignment of the item and/or stamp or other embellishment items. In some embodiments, indicia 122 may be disposed in one-eighth inch increments along one or all of the side portions 120*a-c*, Other increments, such as numbers, gridlines and the like, also may be provided and different indicia may be placed on different side portions or within the same side portion. The indicia may be laser etched or printed to the side portion, or may be on a sticker, decal or the like affixed to one or more of the side portions 120*a-c*. Combinations of techniques and/or indicia may also be used. In addition, any of the techniques for providing any indicia on any of the components of the accessory 100 may be used to provide indicia on any of the other components.

Figure 4:
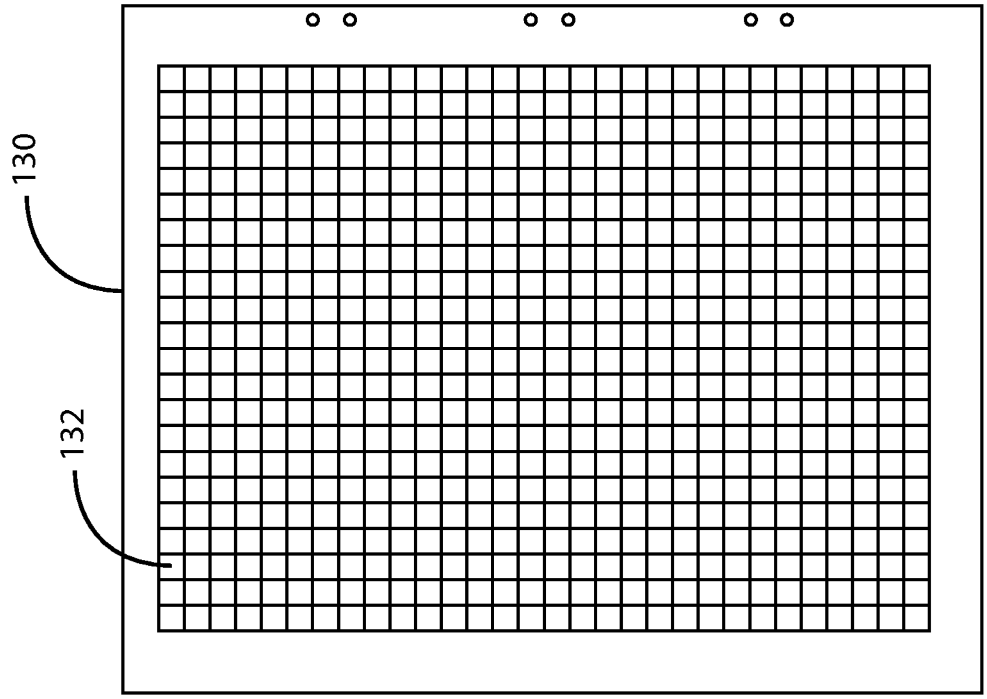
FIG. 4 shows a cover portion of an exemplary craftwork tool.

FIG. 4 shows a cover portion 130 of an exemplary craftwork tool. The cover portion 130 may be dimensioned similarly to the base portion 110, or may be dimensioned differently. In one embodiment, the cover may be about 8" wide by about 10" long. Other sizes, such as sizes appropriate for an accessory 100 having an overall footprint in the ranges discussed above, may also be used. The cover may be made of any suitable rigid or semi-rigid material, such as acrylic or the like. Preferably, the cover is translucent so as to allow a user of the accessory 100 to see the workspace even if the cover is closed. In other embodiments, the cover may be opaque.

Preferably, the cover includes indicia 132 for facilitating alignment of the item and/or stamp. For example, indicia 132 may include one-quarter inch gridlines, one-eighth inch, and the like. The indicia 132 may be, for example, printed or etched onto the cover 132. Other methods of placing indicia 132 on the cover 130 may also be used. In some embodiments, the cover portion 130 does not include any indicia 132.

Figure 5:
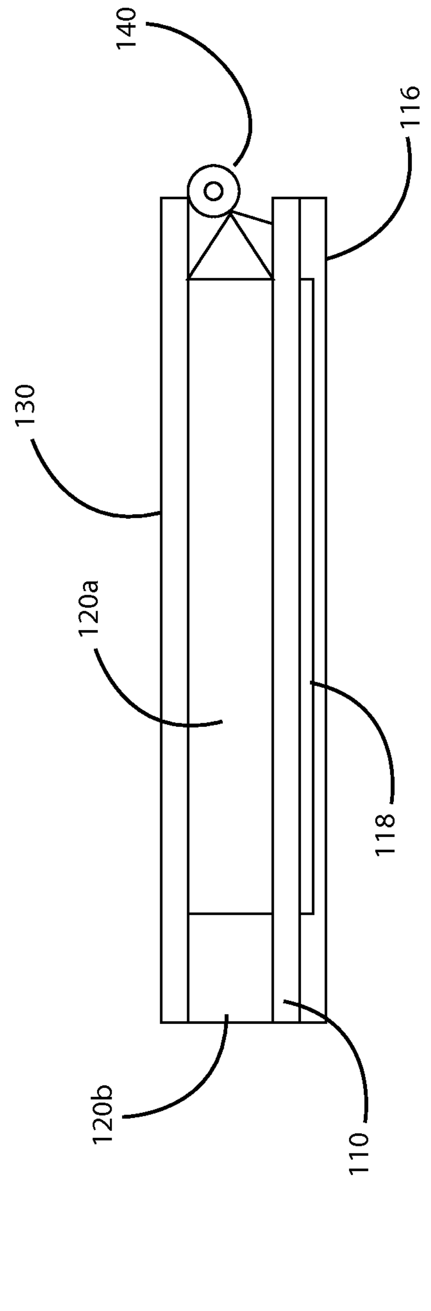
FIG. 5 shows a cross-sectional view of an exemplary craftwork tool.

FIG. 5 shows a cross-sectional view of an exemplary craftwork tool. As illustrated, the accessory 100 includes a base portion 110, side portions 120 *a-b*, and a cover portion 130 attached to the base portion 110 by a hinge assembly 140. In addition, a piece of ferromagnetic material 118 is provided under the base portion 110. The ferromagnetic material. 118 may be secured in position by a non-slip surface 116, which may be attached to the base. Alternatively, both the ferromagnetic material 118 and the non-slip surface 116 may be attached to the base portion 110 independently.

Figure 6:
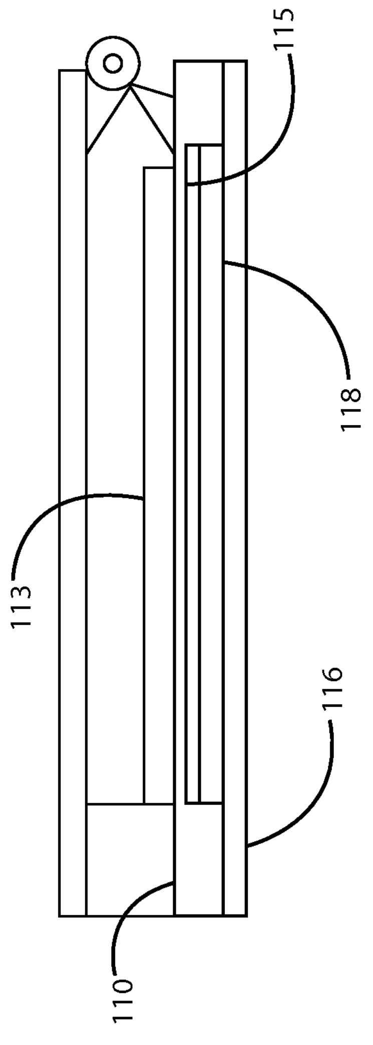
FIG. 6 shows a cross-sectional view of another exemplary craftwork tool.

FIG. 6 shows a cross sectional view of another exemplary craftwork tool. Similar to the embodiment shown in FIG. 5, the accessory 100 includes a base portion 110, side portions 120*a-b*, and a cover portion 130 attached to the base portion 110 by a hinge assembly 140. In the embodiment shown in FIG. 6, a piece of ferromagnetic material 118 is provided in a recessed portion of the base portion 110. Additionally, an element 115 having indicia for alignment is also provided in the recessed portion of the base portion 110 so as to be visible by a user looking down on the workspace 112. Element 115 may be, for example, a piece of grid paper or the like. A removable spacer 113 is also provided in the workspace 112 to reduce the depth of the workspace 112.

Figure 7:
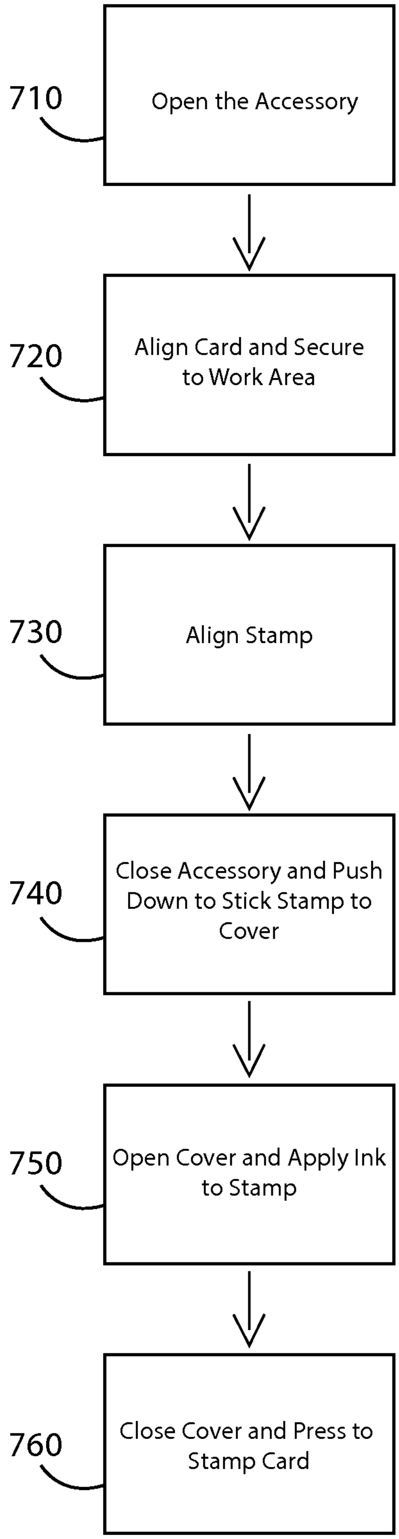
FIG. 7 shows a flow chart of an exemplary method of operation of an exemplary craftwork tool.
Figure 8A:
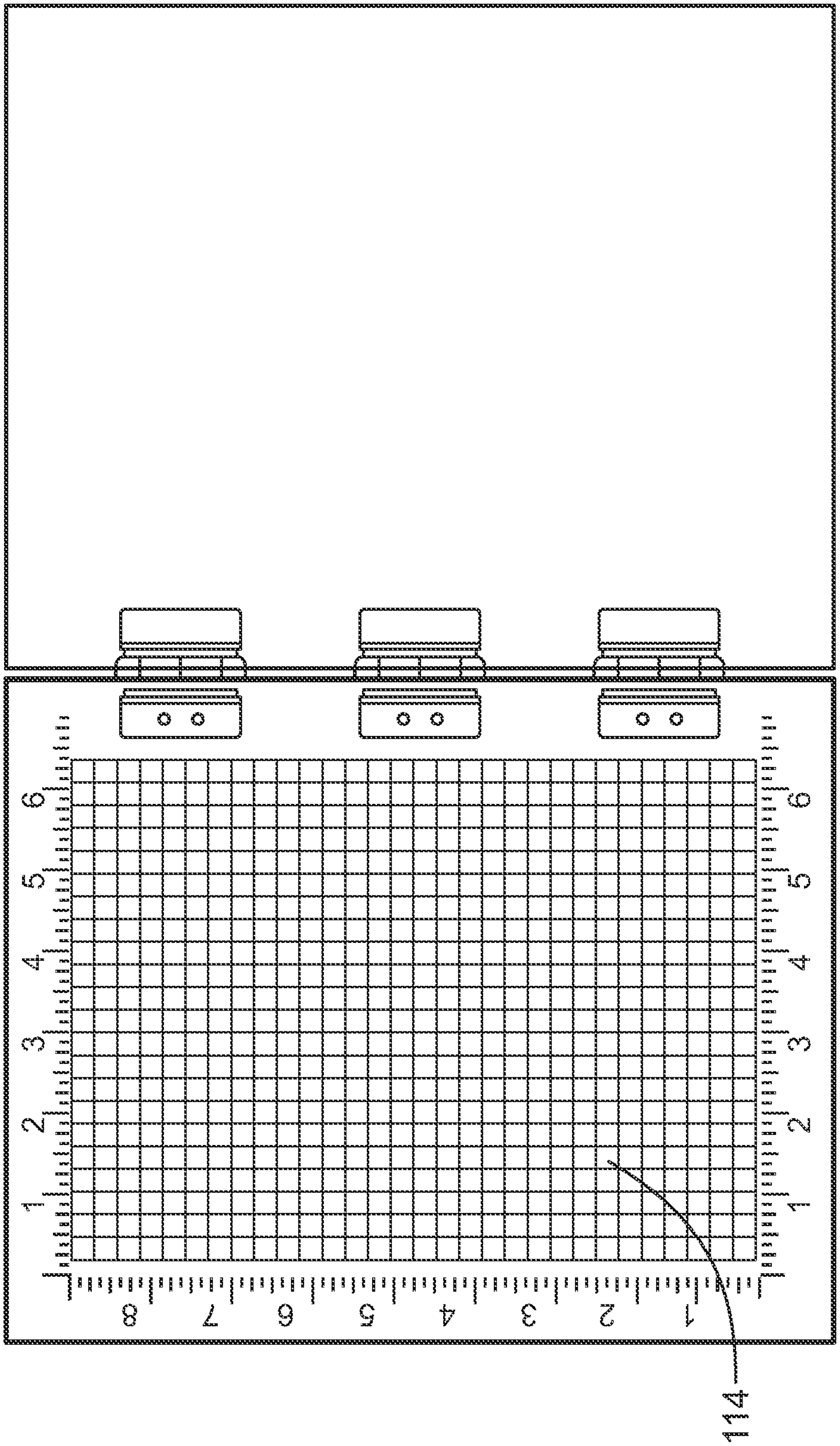
FIGS. 8*a-g* shows a series of depictions of an exemplary craftwork tool while performing the steps shown in FIG. 7.
Figure 8B:
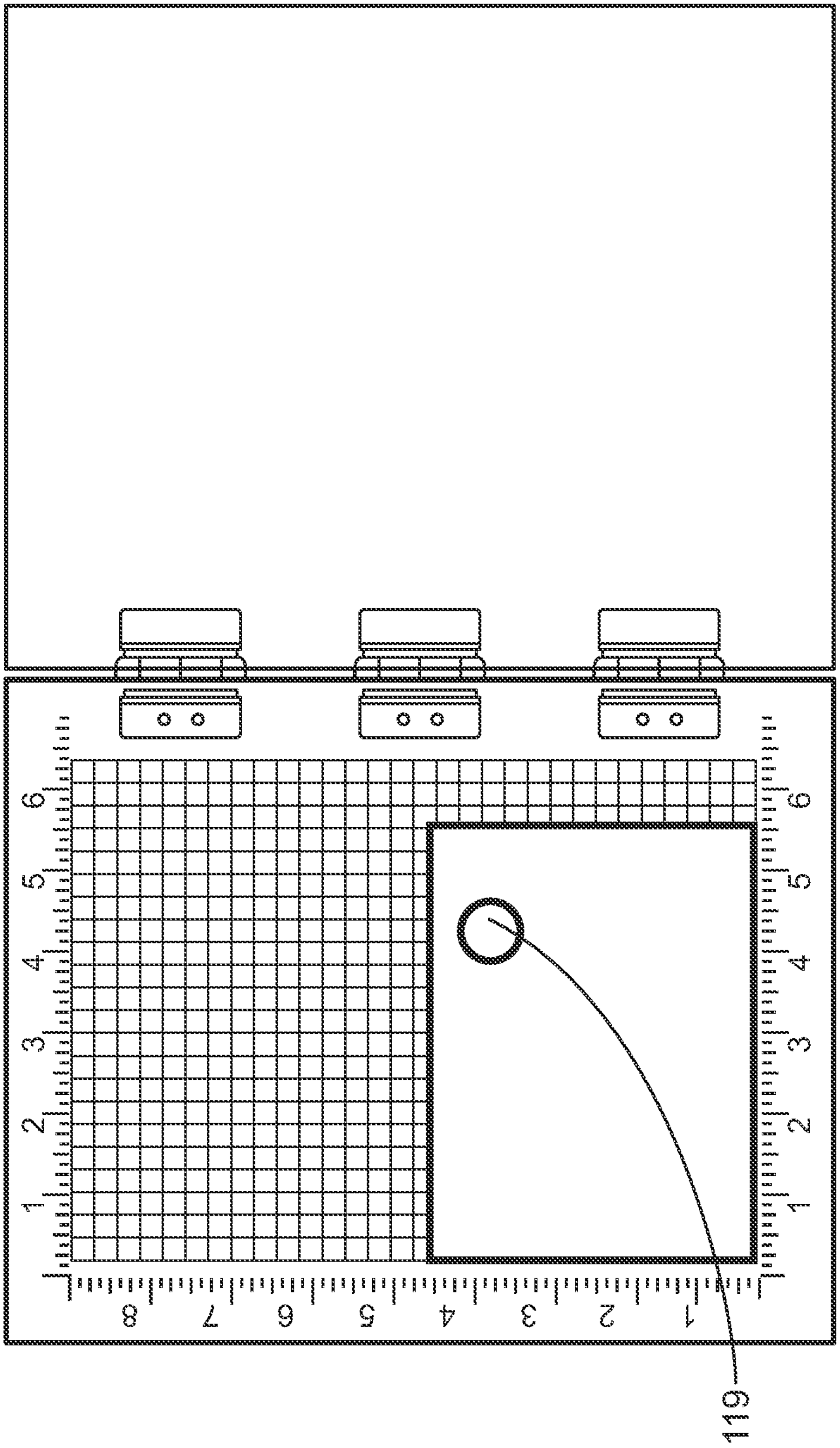
Figure 8C:
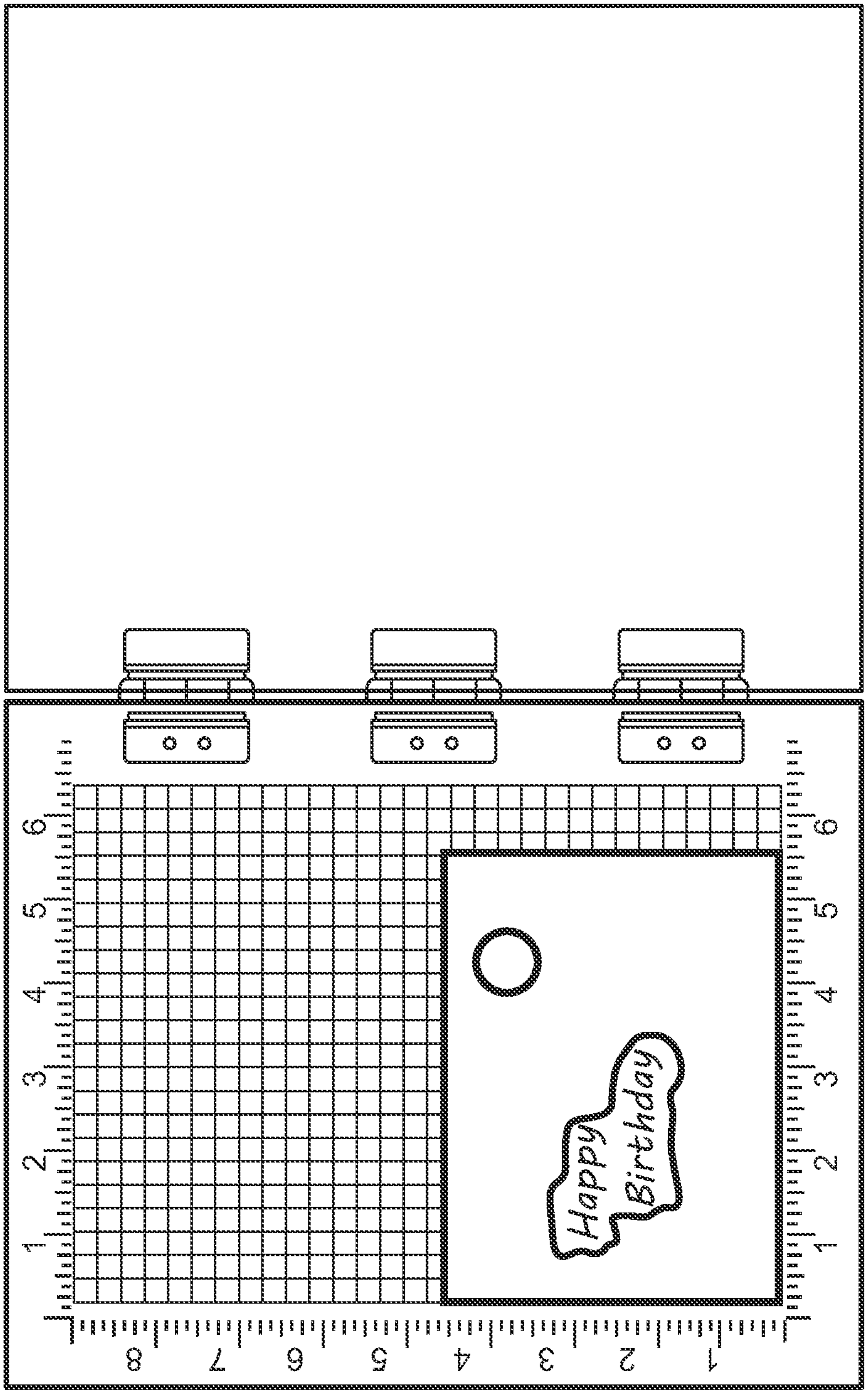
Figure 8D:
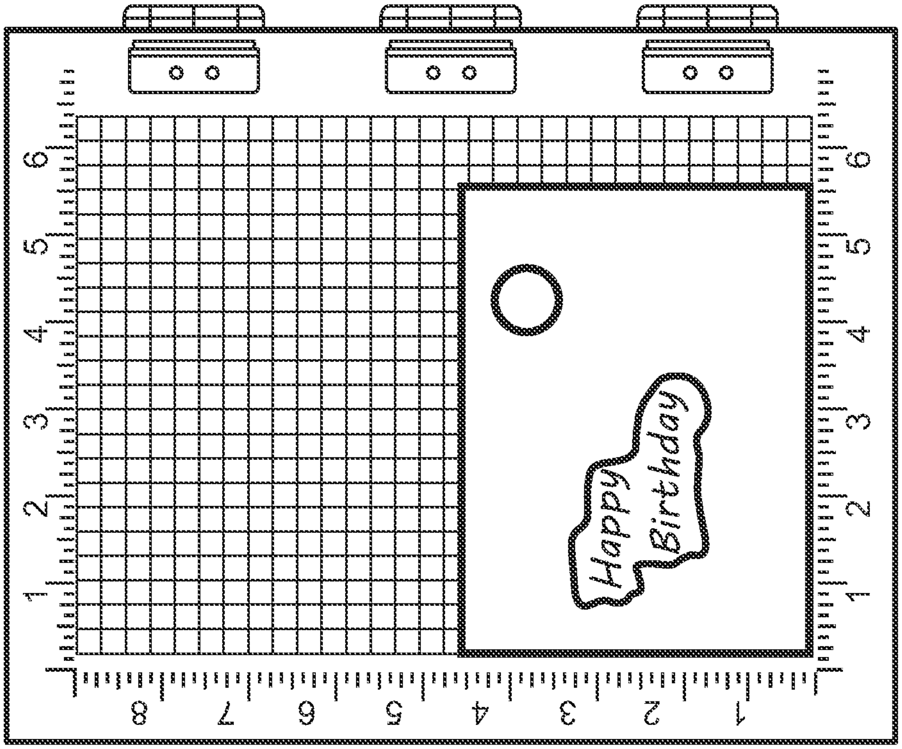
Figure 8E:
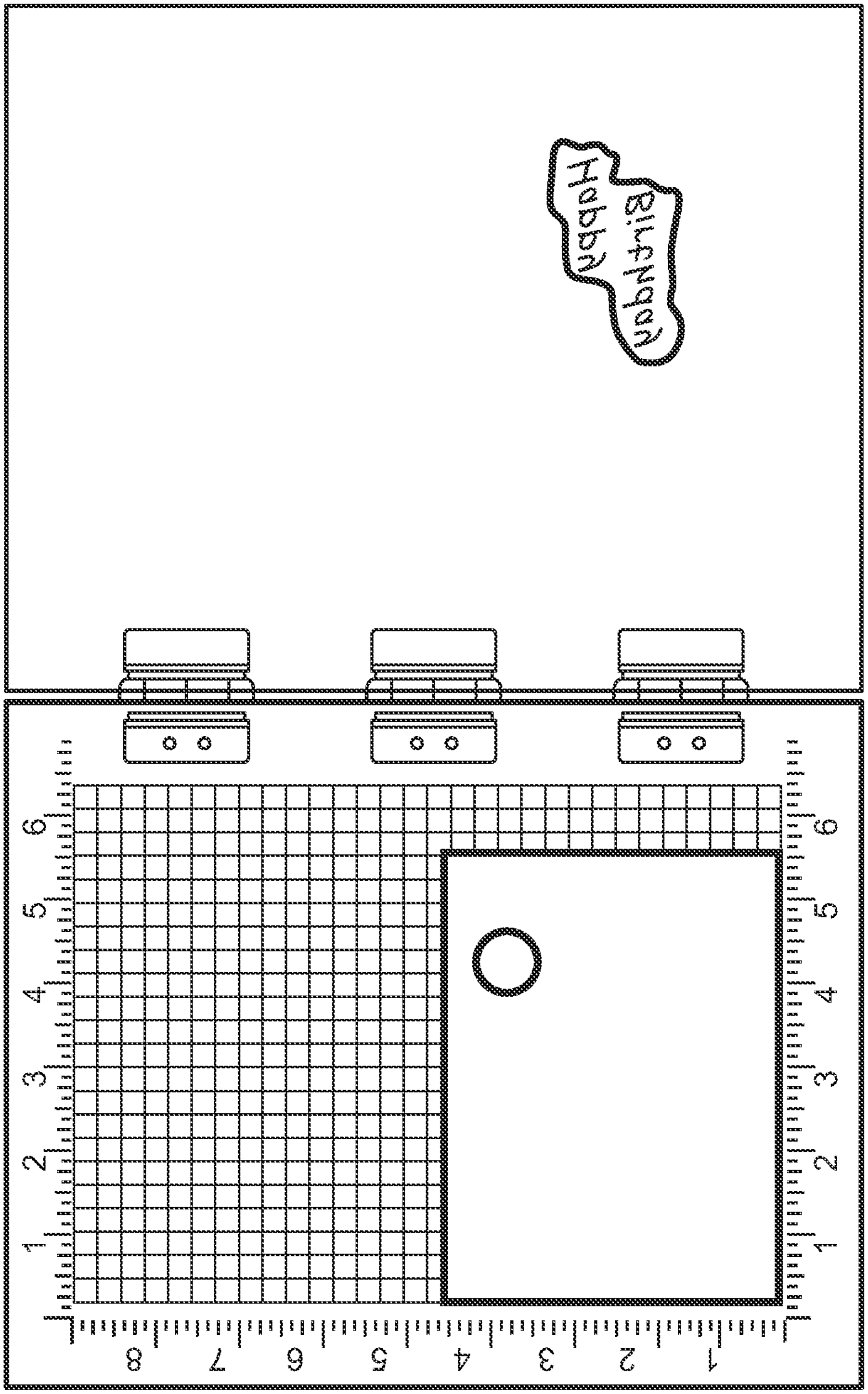
Figure 8F:
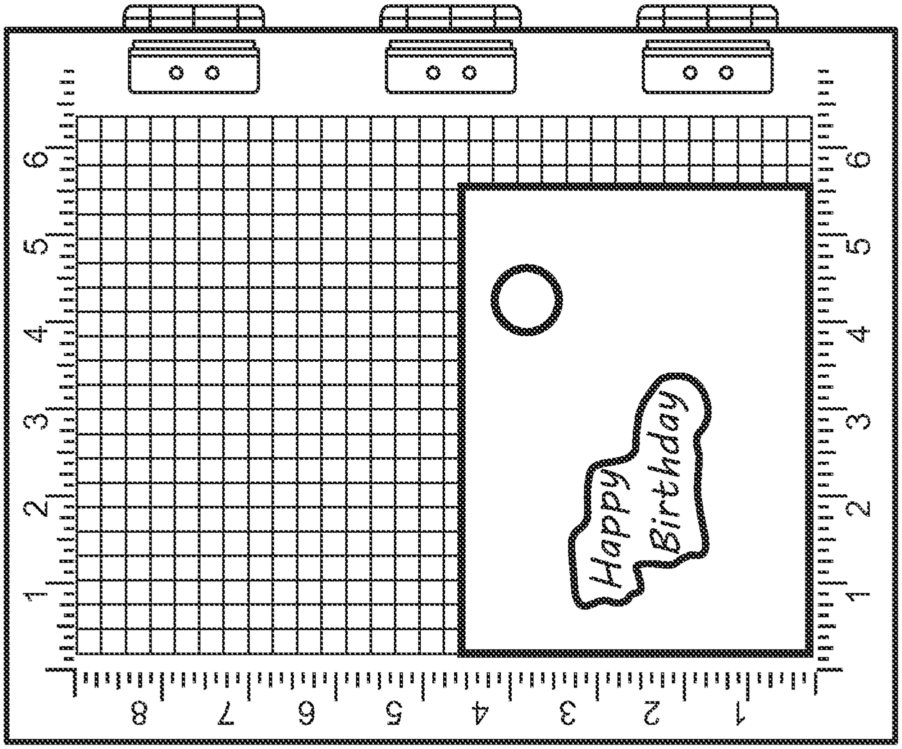
Figure 8G:
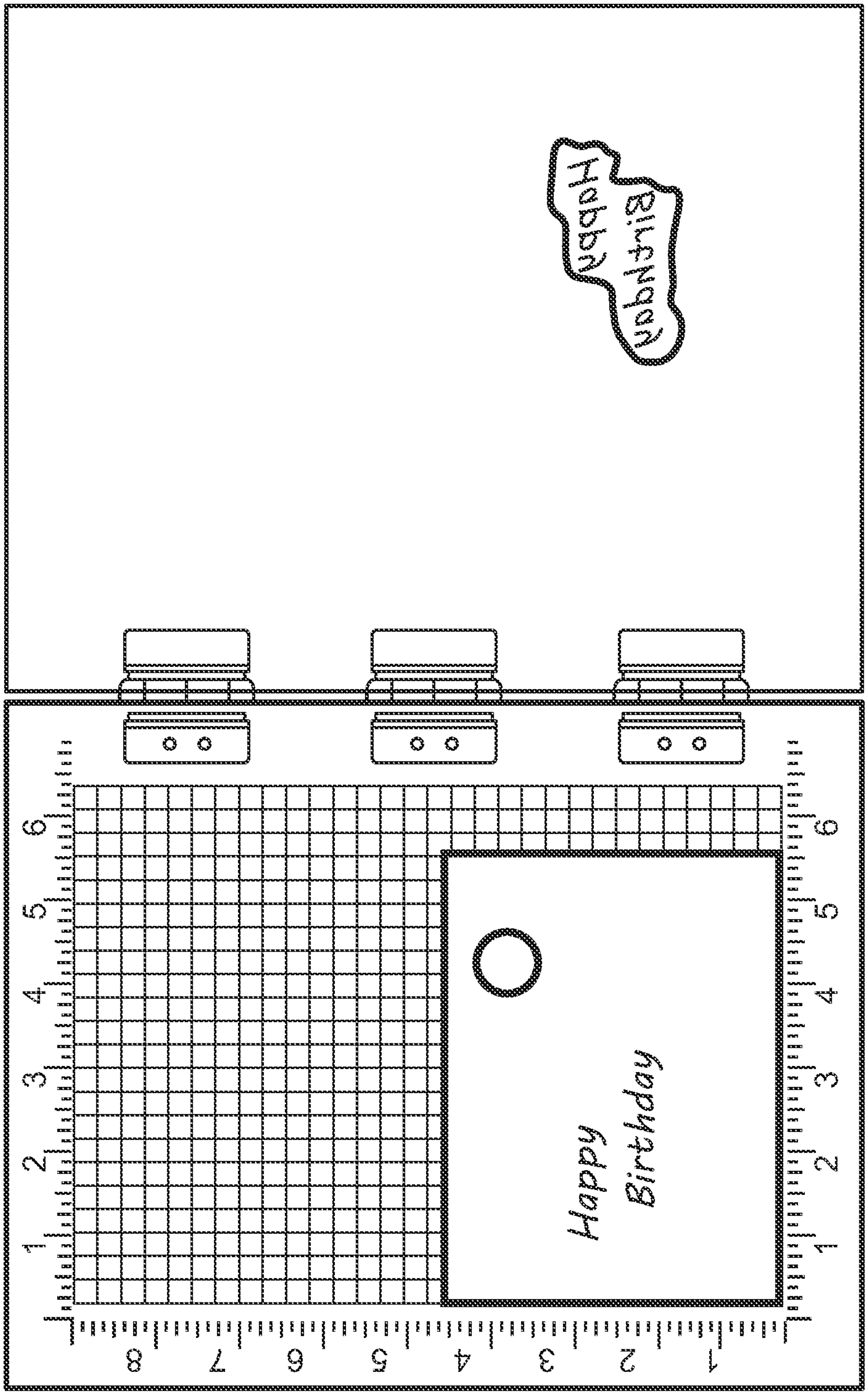

FIG. 7 shows a flow chart of an exemplary method of operation of an exemplary craftwork tool and FIGS. 8*a-g* shows a series of depictions of an exemplary craftwork tool while performing the steps shown in FIG. 7. Initially, a user opens the cover portion 130 of the accessory 100 at step 710 (as shown in FIG. 8*a*). The user then aligns the item in the workspace 112 and optionally secures the item in place at step 720 (as shown in FIG. 8*b*). In the illustrated embodiment, the item is secured in place by placing a magnet 119 on top of the item. Next, the user aligns the stamp on top of the item in a desired position at step 730 (as shown in FIG. 8*c*). In the illustrated embodiment, the user places a "Happy Birthday" stamp on the item. At step 740, the user closes the cover portion 130 and presses down to secure the stamp to the cover portion 130 (as shown in FIG. 8*d*). The user then opens the cover portion 130 and inks the stamp at step 750 (as shown in FIG. 8*d*). Once the stamp is inked, the user may close the cover portion 130 and press down to impress the image on the item at step 760 (as shown in FIG. 8*f*). As a result, the item is left with an impression of the stamped image as shown in FIG. 8*g*.

As should be apparent to one in the art, if a clean impression is not made on the first attempt, the user may reapply ink anchor repress the stamp as necessary. Additionally, because both the item and the stamp are secured in their portions, the user may re-ink the stamp with various colors and apply the new impression to the enhance or otherwise alter the image on the item, or create multiple copies of the same item be aligning a new item in the same position and restamping. Additionally, the top of the cover may be used in a similar manner to stamp items that are not placed in workspace 112, such as oversized items. Referring to the embodiment shown in FIGS. 8*a-g*, a user can (1) place an item to the right of the accessory 100, (2) align a stamp on the item, (3) open the cover 130 and secure the stamp to the cover 130, (4) close the cover 130 and ink the stamp and (5) open the cover 130 to stamp the item. Other methods of operation may also be apparent to one of ordinary skill. Thus, the accessories 100 described herein provide solutions that offer a portable and easy-to-use tool for creating high-quality stamp impressions for a wide variety of uses.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An apparatus for craftwork comprising:

a base comprising a base width, and a base length, the base further comprising a workspace configured to support a stamp able substrate having a widthwise edge and a lengthwise edge, the base comprising gridlines, the base further comprising a widthwise ruler comprising indicia spaced at regular intervals and extending generally parallel to the base width and a lengthwise ruler comprising indicia spaced at regular intervals and extending generally parallel to the base length, the base further comprising a widthwise rigid raised side portion extending above the workspace, located at a widthwise side of the workspace, the widthwise rigid raised side portion providing a structure against which the widthwise edge of the stampable substrate located on the workspace may be positioned, the base further comprising a lengthwise rigid raised side portion extending above the workspace and located at a lengthwise side of the workspace, the lengthwise rigid raised side providing a structure against which the lengthwise edge of the stampable substrate located on the workspace may be positioned;

a translucent or clear cover portion comprising gridlines and configured to move toward and away from the workspace, the cover portion comprising an interior surface configured to face the workspace, the interior surface configured to accept an ink stamp;

a ferromagnetic material; and at least one magnet configured to secure a stampable substrate located on the workspace to the ferromagnetic material.

2. The apparatus of claim 1 wherein the lengthwise rigid raised side portion extends generally parallel to the base length and borders the lengthwise side of the workspace, wherein the widthwise rigid raised side portion extends generally parallel to the base width and borders the widthwise side of the workspace, and further wherein the widthwise rigid raised side portion is disposed at an angle of approximately 90 degrees relative to the lengthwise rigid raised side portion.

3. The apparatus of claim 1 wherein the lengthwise rigid raised side portion is comprised of one piece.

4. The apparatus of claim 1 wherein the widthwise rigid raised side portion is comprised of multiple pieces.

5. The apparatus of claim 1 wherein the workspace is in the form of a removable foam pad.

6. The apparatus of claim 5 wherein the removable foam pad and the lengthwise and widthwise rigid raised side portions each have a height generally perpendicular to the base length and base width, and further wherein the height of the removable foam pad is less than the heights of the lengthwise and widthwise rigid raised side portions.

7. The apparatus of claim 5 wherein the ferromagnetic material is disposed below the removable foam pad.

8. The apparatus of claim 1 wherein the ferromagnetic material is disposed below the workspace.

9. The apparatus of claim 1 wherein the base comprises a base bottom comprising a non-slip surface.

10. The apparatus of claim 1 wherein the cover portion is configured to substantially cover the workspace.

11. The apparatus of claim 1 wherein the widthwise and lengthwise rigid raised side portions are adjacent to a periphery of the base.

12. The apparatus of claim 1 wherein the widthwise and lengthwise rulers are adjacent to a periphery of the base.

13. The apparatus of claim 1 wherein the lengthwise and widthwise rigid raised side portions extend at least ⅛inch above the workspace.

14. The apparatus of claim 1 wherein the lengthwise and widthwise rigid raised side portions each have a height generally perpendicular to the base width and the base height and further wherein the height of the lengthwise and widthwise rigid raised side portions are the same.

15. The apparatus of claim 1 wherein the base and the cover portion are substantially rectangular.

16. A method of stamping a substrate comprising: a) providing the apparatus of claim 1; b) providing a stamp able substrate comprising a widthwise edge and a lengthwise edge; c) placing the widthwise edge of the stamp able substrate on the workspace against the widthwise rigid raised side portion and the lengthwise edge of the stampable substrate against the lengthwise rigid raised side portion; d) placing an ink stamp on the interior surface; and e) moving the cover portion toward the workspace to mark the stampable substrate with the ink stamp.

17. The method of claim 16 wherein the method further comprises placing the at least one magnet on top of the stamp able substrate between step b) and step e).

18. The method of claim 16 wherein, in steps a)-e) the ferromagnetic material is disposed below the workspace, wherein, in step c) the workspace is in the form of a removable foam pad, and further wherein the method further comprises placing the at least one magnet on top of the stampable substrate between step b) and step e).

19. The method of claim 16 wherein the method further comprises placing a removable foam pad against the lengthwise and widthwise rigid raised side portions.

20. The method of claim 16 wherein the lengthwise rigid raised side portion extends generally parallel to the base length and borders the lengthwise side of the workspace, wherein the widthwise rigid raised side portion extends generally parallel to the base width and borders the widthwise side of the workspace, and further wherein the widthwise rigid raised side portion is disposed at an angle of approximately 90 degrees relative to the lengthwise rigid raised side portion.

21. An apparatus for craftwork comprising:

a base comprising a base width, and a base length, the base further comprising a workspace configured to support a stamp able substrate having a widthwise edge and a lengthwise edge, the base further comprising a widthwise ruler comprising indicia spaced at regular intervals and extending generally parallel to the base width and a lengthwise ruler comprising indicia spaced at regular intervals and extending generally parallel to the base length, the base further comprising a widthwise rigid raised side portion extending above the workspace, located at a widthwise side of the workspace, and providing a structure against which the widthwise edge of the stampable substrate located on the workspace may be positioned, the base further comprising a lengthwise rigid raised side portion extending above the workspace and located at a lengthwise side of the workspace, the lengthwise rigid raised side portion providing a structure against which the lengthwise edge of the stamp able substrate located on the workspace may be positioned;

a translucent or clear cover portion configured to move toward and away from the workspace, the cover portion comprising an interior surface configured to face the workspace, the interior surface configured to accept an ink stamp;

a ferromagnetic material; and at least one magnet configured to secure a stampable substrate located on the workspace to the ferromagnetic material.

22. The apparatus of claim 21 wherein the lengthwise rigid raised side portion extends generally parallel to the base length and borders the lengthwise side of the workspace, wherein the widthwise rigid raised side portion extends generally parallel to the base width and borders the widthwise side of the workspace, and further wherein the widthwise rigid raised side portion is disposed at an angle of approximately 90 degrees relative to the lengthwise rigid raised side portion.

23. The apparatus of claim 21 wherein the lengthwise rigid raised side portion is comprised of one piece.

24. The apparatus of claim 21 wherein the widthwise rigid raised side portion is comprised of multiple pieces.

25. The apparatus of claim 21 wherein the ferromagnetic material is disposed below the workspace.

26. The apparatus of claim 21 wherein at least a portion of the base is opaque.

27. The apparatus of claim 21, wherein the cover portion is configured to substantially cover the workspace.

28. The apparatus of claim 21 wherein the lengthwise and widthwise rigid raised side portions extend at least ⅛ inch above the workspace.

29. The apparatus of claim 21 wherein the lengthwise and widthwise rigid raised side portions each have a height generally perpendicular to the base width and the base length, and further wherein the heights of the lengthwise and widthwise rigid raised side portions are the same.

30. The apparatus of claim 21, wherein the cover portion comprises gridlines.

31. A method of stamping a substrate comprising: a) providing the apparatus of claim 21; b) providing a stamp able substrate comprising a widthwise edge and a lengthwise edge; c) placing the widthwise edge of the stamp able substrate on the workspace against the widthwise rigid raised side portion and the lengthwise edge of the stampable substrate against the lengthwise rigid raised side portion; d) placing an ink stamp on the interior surface; and e) moving the cover portion toward the workspace to mark the stampable substrate with the ink stamp.

32. The method of claim 31 wherein the method further comprises placing the at least one magnet on top of the stamp able substrate between step b) and step e).

33. The method of claim 31 wherein, in steps a)-e) the ferromagnetic material is disposed below the workspace, wherein, in step c) the workspace is in the form of a removable foam pad, and further wherein the method further comprises placing the at least one magnet on top of the stampable substrate between step b) and step e).

34. The method of claim 31 wherein the method further comprises placing a removable foam pad against the lengthwise and widthwise rigid raised side portions.

35. The method of claim 31 wherein the lengthwise rigid raised side portion extends generally parallel to the base length and borders the lengthwise side of the workspace, wherein the widthwise rigid raised side portion extends generally parallel to the base width and borders the widthwise side of the workspace, and further wherein the widthwise rigid raised side portion is disposed at an angle of approximately 90 degrees relative to the lengthwise rigid raised side portion.

* * * * *